Feb. 28, 1928.

E. DAVIS 1,660,744

DASHPOT CONSTRUCTION

Filed July 2, 1926

INVENTOR.
Ernest Davis
BY Parsons & Brodell
ATTORNEYS.

Feb. 28, 1928. 1,660,744
E. DAVIS
DASHPOT CONSTRUCTION
Filed July 2, 1926  2 Sheets-Sheet 2
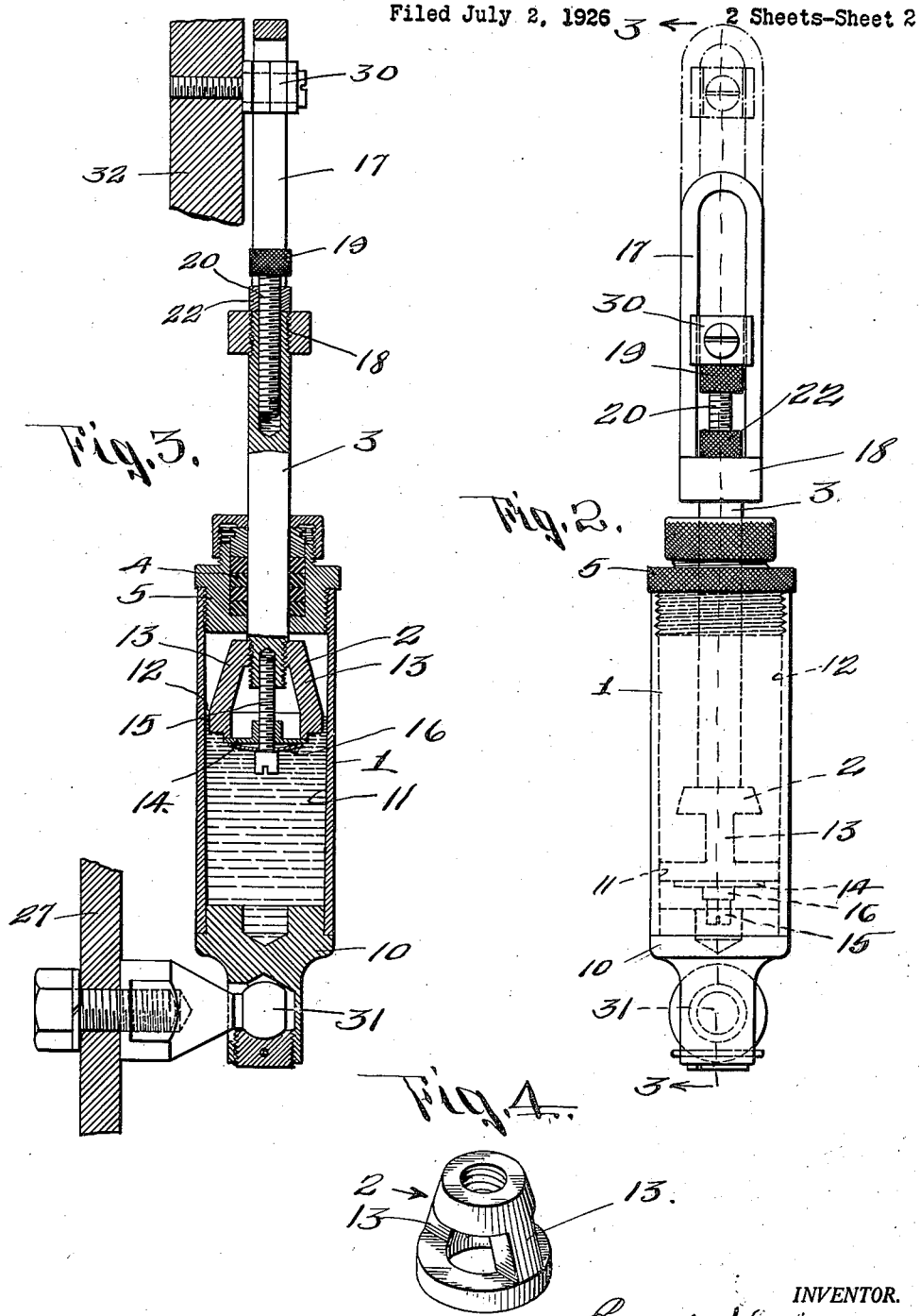
INVENTOR.
Ernest Davis
BY Parsons & Bodell
ATTORNEYS.

Patented Feb. 28, 1928.

1,660,744

UNITED STATES PATENT OFFICE.

ERNEST DAVIS, OF SYRACUSE, NEW YORK, ASSIGNOR TO THE PROSPERITY COMPANY INC., OF SYRACUSE, NEW YORK, A CORPORATION OF NEW YORK.

DASHPOT CONSTRUCTION.

Application filed July 2, 1926. Serial No. 120,115.

This invention relates to dash pots and particularly dash pots usable in connection with pressing machines as garment and laundry pressing machines, which have a head or other movable element movable upwardly and downwardly and movable into closed position by power, and into open position by a counter-weight or counter spring, the dash pot easing the opening movement of the head by the counter-weight or counter spring.

The invention consists in the novel features and in the combinations and constructions hereinafter set forth and claimed.

In describing this invention reference is had to the accompanying drawings in which like characters represent corresponding parts in all the views.

Figure 2 is an enlarged elevation of the dash pot.

Figure 3 is a sectional view on line 3—3, Figure 2.

Figure 4 is a detail view of the piston head.

Figure 1:
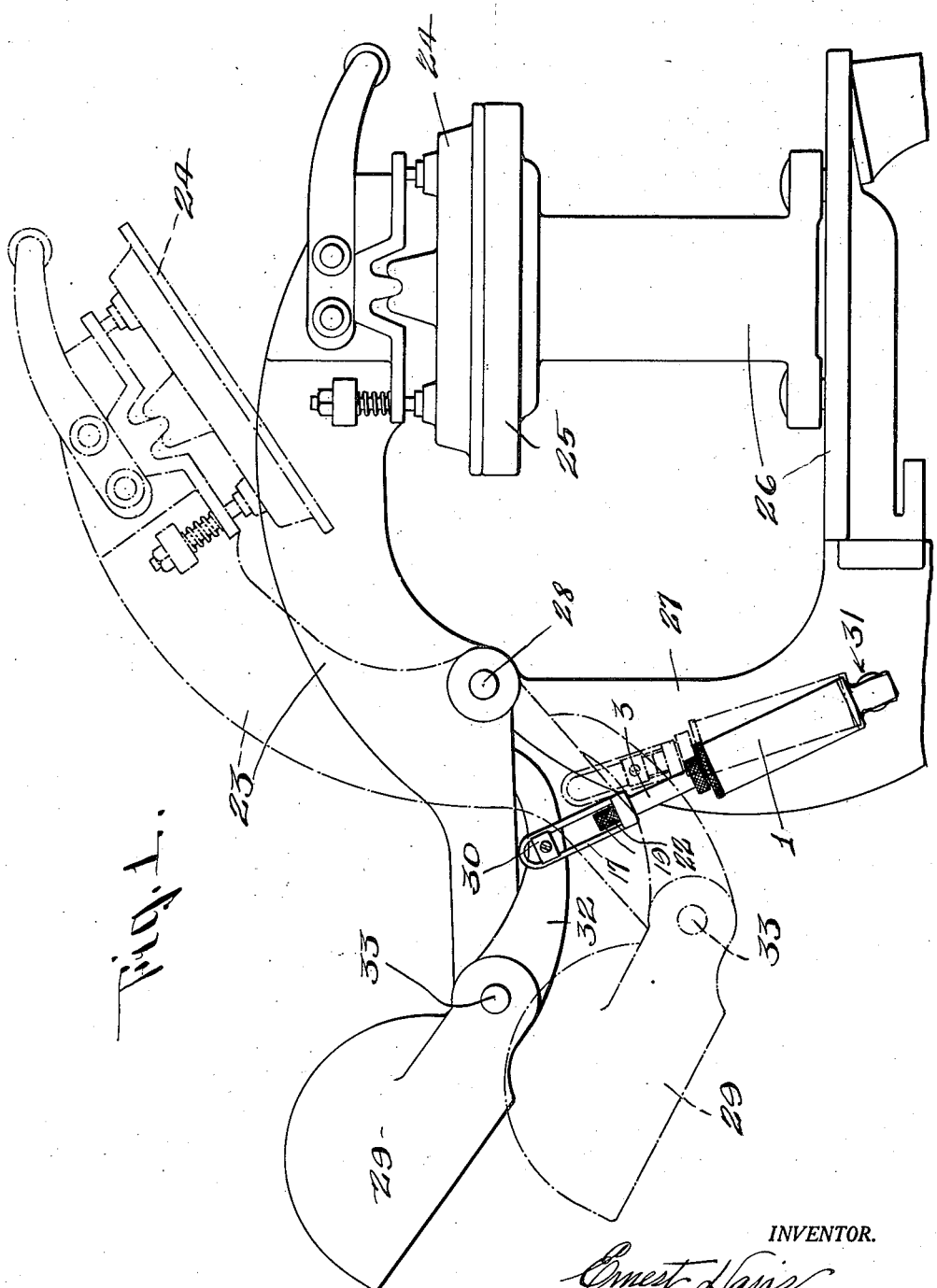
Figure 1 is a side elevation of this dash pot construction as applied to a garment or laundry pressing machine of well known construction.

This dash pot construction comprises generally a cylinder, or a pot, a piston movable in the cylinder, the cylinder being so formed as to provide a by-pass which by-pass is gradually closed as the piston moves from its starting position toward its operated position or the bottom of the dash pot, so that the by-pass is unprovided with valves of any description.

As here illustrated this by-pass, which is gradually closed by the piston during its stroke, is provided by forming the cylinder or pot with the tapered bore of greater diameter at one end than the piston so that an annular space encircles the piston, and of nearly the same diameter as the piston at the other end, so that the piston has nearly a sliding fit at the bottom of the cylinder. Hence during the movement of the piston from its starting position to the bottom of the cylinder, or pot, the oil is displaced around the piston, that is from the lower side to the upper side of the piston through a gradually tapering passage.

1 designates the cylinder, 2 the piston movable in the cylinder and having a piston rod 3 extending through the gland or packed bearing 4, formed in the head 5 at the upper end of the cylinder, the rod guiding the piston in its reciprocating movement.

10 is the head at the lower end of the cylinder.

As shown the cylinder is formed with its bore 11 tapered from its upper end toward its lower end thereby providing an annular space 12 around the piston when the piston is in the upper end of the cylinder, which space gradually tapers into the diameter of the piston toward the lower end of the cylinder. Hence the tapered bore forms a tapered by-pass around the cylinder, that is from the lower to the upper side thereof which by-pass is gradually closed during the movement of the piston.

The piston 2 is here shown as formed of a skeleton body consisting of upper and lower rings connected by lengthwise frame members 13, and a head 14 closing the lower end of the piston and connected to the piston by a screw 15 extending through a spring washer 16 and through said head 14, and threading into the lower end of the piston rod 3. The upper end of the piston body is threaded for receiving the lower threaded end of the piston rod 3.

The piston rod 3 is here shown as connected to its actuator by a lost motion or pin and slot connection, which lost motion is adjustable to regulate the length or throw of the piston to any desired length with the starting position point of the piston always at the same point regardless of what the adjustment is.

As here shown the piston rod is provided with a slotted head or yoke 17 threaded at 18 on the upper end thereof and an adjustable shoulder is located at the lower end of the yoke, said shoulder being the head 19 of a screw 20 threading into the upper end of the rod 3. A suitable lock nut 22 threads on the screw 20 against the upper end of the rod.

The actuator is here shown as the yoke or lever 23, which carries the head 24 of a pressing machine, which head is movable toward and from a buck 25 mounted on the frame 26 of the pressing machine.

This frame includes an upwardly extending standard 27 to which the lever 23 is pivoted between its ends at 28. The lever is provided with a suitable counterweight 29 at its rear end, which tends to bring the press head 24 into its elevated position indicated in broken lines, Figure 1.

The head is actuated into pressing position in any well known manner, either by foot or by power. In either case when the force tending to hold the press in pressing position is released the head opens with a violent reaction due either to a spring pad on the buck or to the spring of the frame or to both.

This dash pot construction is particularly applicable for gradually easing the opening of the head due to the counterweight 29 or the countersprings. As here shown the lever 23 is provided with a slide 30, which works in the slot of the head 17 toward and from the shoulder or head 19 of the adjusting screw. Owing to the adjusting screw, regardless of the adjustment of the shoulder 19, the piston 2 is always retracted to the same elevated position upon closing of the press.

The head 10 of the cylinder is suitably pivoted by a ball and socket joint 31 to the frame of the machine or the standard 27. The slide 30 is here shown as provided on a forwardly extending arm 32 of the weight 29, which weight is shown as secured to the rear arm of the lever 23 by a pivot 33, the arm 32 bearing against the rear arm of the lever or yoke, prevents weight from pivotal movement. It is immaterial whether the slide 30 is carried directly by the rear arm of the lever or by the counter-weight of the lever.

What I claim is:—

1. In a dash pot comprising a cylinder, a piston movable in the cylinder and having a rod, a yoke connected to the rod, a shoulder at the end of the yoke adjacent the rod, the shoulder being adjustable lengthwise of the yoke, and an actuator connected to the yoke and having a part slidable thereon toward and from said shoulder.

2. A dash pot construction comprising a cylinder, a piston movable in the cylinder and having a rod, a slotted head connected to the piston rod, a shoulder within the slot at one end thereof adjustable lengthwise of the slot and an actuator having a slide movable in the slotted head toward and from the shoulder.

3. A dash pot construction comprising a cylinder, a piston movable in the cylinder and having a slotted head mounted on the rod, a screw threading endwise into the rod and having its head located at one end of the slot of the slotted head, and an actuator having a slide movable along the slot into and out of engagement with the head of the screw.

4. The combination of a pressing machine including cooperating pressing elements, one of which is movable toward and from the other, a carrier for the movable element comprising a lever pivoted to the frame, a dash pot comprising a cylinder connected to the frame, and a piston movable in the cylinder connected to said lever.

In testimony whereof, I have hereunto signed my name, at Syracuse, in the county of Onondaga and in the State of New York, this 7th day of June, 1926.

ERNEST DAVIS.